(12) United States Patent
Wakasugi

(10) Patent No.: US 6,169,610 B1
(45) Date of Patent: Jan. 2, 2001

(54) NETWORK COMMUNICATION SYSTEM

(75) Inventor: Naoki Wakasugi, Kanagawa (JP)

(73) Assignee: Ricoh Company, Ltd., Tokyo (JP)

( * ) Notice: Under 35 U.S.C. 154(b), the term of this patent shall be extended for 0 days.

(21) Appl. No.: 08/957,123

(22) Filed: Oct. 24, 1997

(30) Foreign Application Priority Data

Oct. 25, 1996 (JP) .................................................. 8-299857

(51) Int. Cl.[7] ................................ H04N 1/00; H04N 1/32
(52) U.S. Cl. ...................... 358/442; 358/407; 379/100.09
(58) Field of Search .................... 358/434–436, 358/438–439, 402, 442, 407; 395/200.8, 200.58; 379/100.08, 100.09; 370/428, 465, 466, 467

(56) References Cited

U.S. PATENT DOCUMENTS

| 5,014,300 | * | 5/1991 | Harvath et al. ........................ 379/100 |
| 5,091,790 | * | 2/1992 | Silverberg .............................. 358/434 |
| 5,287,199 | * | 2/1994 | Zoccolillo ............................. 358/402 |
| 5,461,488 | * | 10/1995 | Witek .................................... 358/402 |
| 5,521,719 | * | 5/1996 | Yamada .................................. 358/438 |
| 5,644,404 | * | 7/1997 | Hashimoto et al. ................... 358/402 |
| 5,751,442 | * | 5/1998 | Hamada et al. ....................... 358/442 |
| 5,805,298 | * | 9/1998 | Ho et al. ................................ 358/402 |
| 5,892,587 | * | 4/1999 | Okada et al. .......................... 358/402 |

* cited by examiner

Primary Examiner—Kimberly A. Williams
(74) Attorney, Agent, or Firm—Cooper & Dunham LLP

(57) ABSTRACT

A source communication terminal includes a redirection unit for redirecting target data for transmission and a modem control command issued by data communication software to a communication interface, to a designated communication terminal on a network via the network interface, and for transferring a response message returned from the designated communication terminal in reply to the modem control command from the designated communication, to the data communication software.

18 Claims, 13 Drawing Sheets

FIG. 13

| ADDRESS CONVERSION TABLE ||
|---|---|
| ORIGINATION IDENTIFICATION INFORMATION | MAIL ADDRESS |
| 0312345678 | ws1 @ abc.co.jp |
| 0462123456 | ws2 @ abc.co.jp |
| ⋮ | ⋮ |

NETWORK COMMUNICATION SYSTEM

BACKGROUND OF THE INVENTION

1. Field of the Invention

The present invention generally relates to network communication systems and, more particularly, to a network communication system in which data is transferred over a network from a source terminal on the network to a designated terminal also on the network provided with a modem, whereupon the designated terminal forwards the data to a destination terminal over a communication circuit using the modem.

2. Description of the Related Art

According to the related art, transmission over a network of facsimile data or the like from a source terminal such as a personal computer or a workstation located on a network such as a local area network (LAN) is performed in the following manner. First, the facsimile data or the like is transferred, over the network, to a designated terminal having a built-in or attached modem and located on the network, in the form of a file having a destination telephone number and the like attached to the file so as to specify a destination terminal. Upon receipt of the data, the designated terminal provided with the modem stores the transferred file to a storage device such as a temporary memory or a hard disk unit. After the transferred file has been successfully stored, the designated terminal controls the modem provided in or attached to itself so as to transmit the data to the destination terminal over the communication circuit.

Such an approach demands that a data communication application run on the source terminal be compatible with data communication over the network.

Personal computers (computer equipment assumed in the present invention) with a communication interface such as an RS-232C interface as a standard feature has found wide applications recently. Generally, a personal computer performs data communication by controlling a data modem, a fax modem, a data/fax modem or the like connected to the communication interface, using a data communication means such as a facsimile communication application.

The conventional approach has a drawback in that, even when the source terminal as mentioned above is equipped with a low-cost communication interface such as the standard RS-232C interface and has installed thereon a data communication application for controlling a modem connected to the communication interface, it is necessary to add a network interface such as a LAN interface and to install a data communication application compatible with data transmission over the network, in order to perform data transmission over the network. Another drawback of the conventional approach is that a user of the source terminal is obliged to adapt to the data communication application compatible with network data transmission which obliges a different mode of operation from the data communication application for controlling the modem connected to the communication interface.

SUMMARY OF THE INVENTION

Accordingly, an object of the present invention is to provide a network communication system in which the aforementioned drawback is eliminated.

Another and more specific object of the present invention is to provide a network communication system in which a terminal on a network can use a data communication means performing data transmission by controlling a modem connected to a communication interface of the terminal, for data transmission over the network.

The aforementioned objects can be achieved by a network communication system for causing a source communication terminal on a network to transfer data via the network to a designated communication terminal on the network, and for causing the designated communication terminal to transmit the transferred data to a destination communication terminal over a communication circuit, wherein the source communication terminal comprises: a communication interface; a first modem connected to the communication circuit via the communication interface; data communication means for controlling the first modem so as to perform data communication; a first network interface connected to the network; and redirection means for redirecting target data for transmission and a modem control command issued by the data communication means to the communication interface, to the designated communication terminal via the first network interface, and for transferring a response message returned by the designated communication terminal in reply to the modem control command via the first network interface, to the data communication means, and wherein the designated communication terminal comprises: a second modem connected to the communication circuit; a second network interface connected to the network; and modem controlling means for outputting the target data for transmission and the modem control command redirected by the redirection means via the network, to the second modem, and for transferring the response message returned by the second modem in reply to the modem control command from the source communication terminal, to the source communication terminal via the network interface.

According to the network communication system as described above, the second modem provided in the designated communication terminal does not make any distinction between the target data and the modem control command transferred from the source communication terminal via said network, and the target data and the modem control command directly issued by the designated communication terminal. The second modem outputs a response message in reply to the modem control command from the source communication terminal. The output response message is received by the modem controlling means and transferred to the source communication terminal via the network interface. The response message thus transferred is forwarded by the redirection means to the data communication means. The data communication means makes no distinction between the response message from the first modem presumably (from the viewpoint of the data communication means) connected to the communication interface and the response message from the second modem. Accordingly, the data communication means designed to control the first modem for data transmission can also be used for data transmission using the designated communication terminal.

The aforementioned objects can also be achieved by a network communication system for causing a source communication terminal on a network to transfer data via the network to a designated communication terminal on the network, and for causing the designated communication terminal to transmit the transferred data to a destination communication terminal over a communication circuit, wherein the source communication terminal comprises: a communication interface; a first modem connected to the communication circuit via the communication interface; data communication means for controlling the first modem so as to perform data communication; a first network interface connected to the network; and redirection means for redirecting target data for transmission and a modem control command issued by the data communication means to the communication interface, to the designated communication terminal via the first network interface, and for transferring a response message returned by the designated communication terminal in reply to the modem control command via the first network interface, to the data communication means, and wherein the designated communication terminal comprises: a second modem connected to the communication circuit; a second network interface connected to the network; and modem simulating means for receiving the target data for transmission and the modem control command redirected by the redirection means via the network, for transferring a simulated reply message in reply to the modem control command, to the source communication terminal via the network interface, for storing the target data for transmission in a storage unit together with transmission-related information obtained from the modem control command, and for transmitting the target data for transmission stored in the storage unit to the destination communication terminal over the communication circuit, by controlling the second modem in accordance with the transmission-related information.

According to the network communication system as described above, the data communication means makes no distinction between the response message from the first modem presumably (from the viewpoint of the data communication means) connected to the communication interface and the simulated response message from the designated communication terminal via the network interface. Therefore, the data communication means is equally applicable to transmission directly from the source communication terminal and transmission using the designated communication terminal. The second modem is controlled by the modem simulating means such that the second modem makes no distinction between transmission of data originally provided in the designated communication terminal and transmission of data transferred from the source communication terminal. More specifically, the modem simulating means receives the data from the source communication terminal by simulating the first modem and stores the data in the storage unit. By using the storage unit, it is possible for the designated communication terminal to simultaneously receive data from a plurality of source communication terminals and store the data in the storage unit. The designated communication terminal sequentially reads out the data from the plurality of source communication terminals from the storage unit and controls the second modem to transmit the data to respective destination communication terminals.

The aforementioned objects can also be achieved by a network communication system for causing a source communication terminal on a network to transfer data via the network to a designated communication terminal on the network, and for causing the designated communication terminal to transmit the transferred data to a destination communication terminal over a communication circuit, wherein the source communication terminal comprises: a communication interface; a first modem connected to the communication circuit via the communication interface; data communication means for controlling the first modem so as to perform data communication; a first network interface connected to the network; and redirection means for redirecting target data for transmission and a modem control command issued by the data communication means to the communication interface, to the designated communication terminal via the first network interface, and for transferring a response message returned by the designated communication terminal in reply to the modem control command via the first network interface, to the data communication means, and wherein the designated communication terminal comprises: a second modem connected to the communication circuit; a second network interface connected to the network; and modem controlling and simulating means for outputting, when the second modem is not busy, the target data for transmission and the modem control command redirected by the redirection means via the network, to the second modem, and for transferring, when the second modem is not busy, the response message returned by the second modem in reply to the modem control command from the source communication terminal, to the source communication terminal via the network interface, for receiving, when the second modem is busy, the target data for transmission and the modem control command redirected by the redirection means via the network, for transferring, when the second modem is busy, a simulated reply message in reply to the modem control command, to the source communication terminal via the network interface, for storing, when the second modem is busy, the target data for transmission in a storage unit together with transmission-related information obtained from the modem control command, and for transmitting, when the second modem is busy, the target data for transmission stored in the storage unit to the destination communication terminal over the communication circuit, by controlling the second modem in accordance with the transmission-related information.

According to the network communication system described above, the redirection means redirects the target data for transmission and the modem control command, intended to be issued to the first modem presumably (from the viewpoint of the data communication means) connected to the communication interface, to the second modem. The second modem receives the redirected data and command when it is not busy such that the second modem does not make any distinction between the target data and the modem control command transferred from the source communication terminal via said network, and the target data and the modem control command directly issued by the designated communication terminal. The second modem outputs a response message in reply to the modem control command from the source communication terminal. The output response message is received by the modem controlling and simulating means and transferred to the source communication terminal via the network interface. The response message thus transferred is forwarded by the redirection means to the data communication means. The data communication means makes no distinction between the response message from the first modem presumably (from the viewpoint of the data communication means) connected to the communication interface and the response message from the second modem. Accordingly, the data communication means designed to control the first modem for data transmission can also be used for data transmission using the designated communication terminal. When the second modem is busy, the modem controlling and simulating means receives the target data for transmission and the modem control command redirected by the redirection means and stores the received data and command in the storage unit. The modem controlling and simulating provides a simulated response message to the source communication terminal via the network interface. The data communication means makes no distinction between the response message from the first modem presumably (from the viewpoint of the data communication means) connected to the communication interface and the simulated response message from the designated communication terminal via the network interface. Therefore, the data communication means is equally applicable to transmission directly from the source communication terminal and transmission using the designated communication terminal. The second modem is controlled by the modem controlling and simulating means such that the second modem makes no distinction between transmission of data originally provided in the designated communication terminal and transmission of data transferred from the source communication terminal. More specifically, the modem controlling and simulating means receives the data from the source communication terminal by simulating the first modem and stores the data in the storage unit. By using the storage unit, it is possible for the designated communication terminal to simultaneously receive data from a plurality of source communication terminals and store the data in the storage unit. The designated communication terminal sequentially reads out the data from the plurality of source communication terminals from the storage unit and controls the second modem to transmit the data to respective destination communication terminals. Unlike an arrangement where the target data for transmission is stored in the storage unit irrespective of whether or not the second modem is busy, the invention according to the above aspect ensures that data transmission requested when the second modem is not busy is processed with no time delay so that transmission is performed efficiently.

The designated communication terminal may further comprise: a correspondence table for listing source identification information identifying the source communication terminal and mail addresses in such a way as to relate the source identification information to the corresponding mail address; and transmission result mail transmitting means for preparing an electronic mail message that includes a result of transmission of the target data for transmission to the destination communication terminal, referring to the correspondence table to retrieve the mail address that corresponds to the source identification information obtained by examining the modem control command transferred from the source communication terminal via the network interface, and for sending the electronic mail message to the mail address thus retrieved.

According to the above described aspect of the invention, the source communication terminal receives the result of requested transmission in the form of an electronic mail message. Accordingly, an operator of the source communication terminal can acknowledge the result of transmission by examining the electronic mail message.

BRIEF DESCRIPTION OF THE DRAWINGS

Other objects and further features of the present invention will be apparent from the following detailed description when read in conjunction with the accompanying drawings in which:

FIG. 13. shows an address conversion table.

DESCRIPTION OF THE PREFERRED EMBODIMENTS

Figure 1:
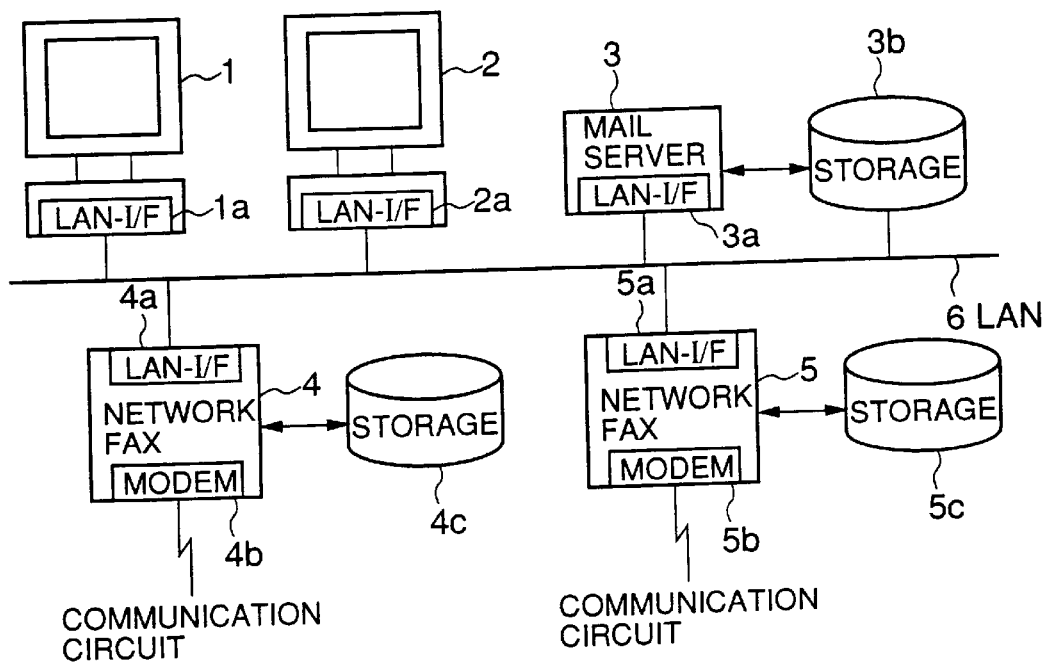
FIG. 1 is a block diagram showing a network communication system according to the present invention.

FIG. 1 is a block diagram showing a network communication system according to the present invention. Referring to FIG. 1, computer terminals 1 and 2 are personal computers of the same construction. Each of the computer terminals 1 and 2 is connected to a local area network (LAN) 6 such as an Ethernet via a LAN-I/F 1a and a LAN/I/F 2a, respectively. The computer terminals 1 and 2 are typical computer terminals connected to the LAN 6. Although omitted from the illustration, other computer terminals having the same construction could be connected to the LAN 6.

A mail server 3 has a storage unit 3b and controls exchange of electronic mail between the terminals on the LAN 6. The mail server 3 is connected to the LAN 6 via a LAN-I/F 3a.

Network facsimile machines 4 and 5 has modems 4b and 5b, respectively, connected to a general communication circuit such the Public Switched Telephone Network (PSTN). In addition to operating as a stand-alone facsimile machine for transmitting facsimile data read by a scanner provided in the machine, each of the facsimile machines 4 and 5 is connected to the LAN 6 so as to forward facsimile data transferred via the LAN 6 from the computer terminals 1 and 2. In the present invention, it is assumed that the communication circuit connected to the modems 4b and 5b is the PSTN and the network facsimile machines 4 and 5 are G3 facsimile machines. The network facsimile machines 4 and 5 have storage units 4c and 5c, respectively.

Figure 2:
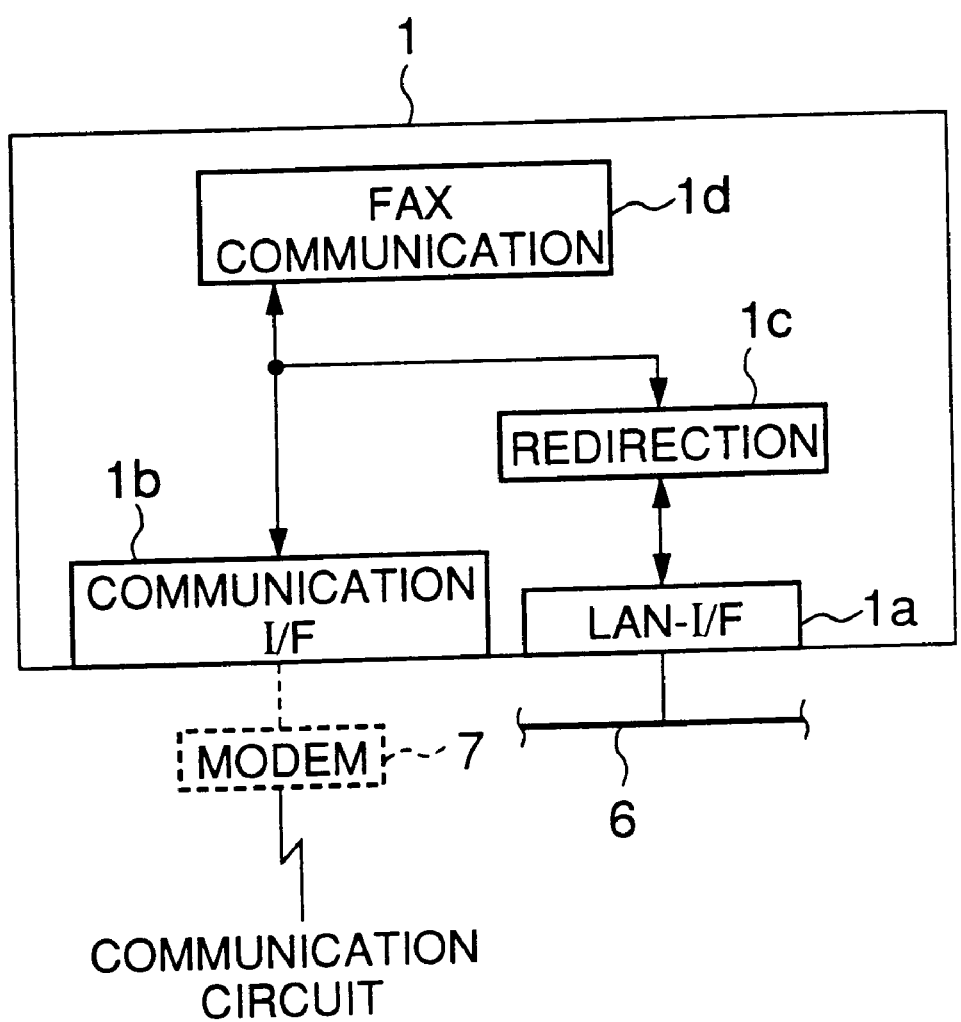
FIG. 2 is a block diagram showing parts of a computer terminal which parts are directly related to the present invention.

FIG. 2 is a block diagram showing parts of the computer terminal 1 which parts are directly related to the present invention. The computer terminal 2 also has the construction as illustrated in FIG. 2.

Referring to FIG. 2, the LAN-I/F 1a is an interface for connecting the computer terminal 1 to the LAN 6. A communication I/F 1b is, for example, an RS-232C interface. A modem 7 having a fax modem function compatible with modem control commands such as Class 1 AT commands or Class 2 AT commands may be connected to the communication interface I/F 1b. A facsimile communication means 1d performs facsimile data transmission and reception between a source terminal and a destination terminal over the communication circuit, by issuing a modem control command to the modem 7 connected to the communication I/F 1b and by receiving a response message from the modem 7 in reply to the modem control command. The facsimile communication means 1d is implemented by causing the computer terminal 1, operated on a predetermined operating system for a personal computer, to load a facsimile communication application stored in the hard disk unit to a RAM and by causing the MPU to operate in accordance with the program loaded to the RAM. Of course, the facsimile communication means 1d may be implemented by a dedicated electronic circuit.

In addition to the known construction as described above, the computer terminal 1 further comprises a redirection means 1c. The redirect means 1c redirects a modem control command and facsimile data issued by the facsimile communication means 1d to the modem 7 connected to the communication I/F 1b, to a designated network facsimile machine (in this case, it is assumed that the network facsimile machine 4 is designated) in the form of packets via the LAN-I/F 1a and the LAN 6. The redirection means 1c also forwards a response message from the network facsimile machine 4 in reply to the modem control command issued by the facsimile communication means 1d, to the facsimile communication means 1d. The redirection means 1c is implemented by causing the computer terminal 1 to load driver software stored in the hard disk unit to the RAM so as to be resident therein and by causing the MPU to operate in accordance with the driver software loaded to the RAM. Of course, the redirection means 1c may be implemented by a dedicated electronic circuit. A detailed description of the redirection means 1c will be given later.

Figure 3:
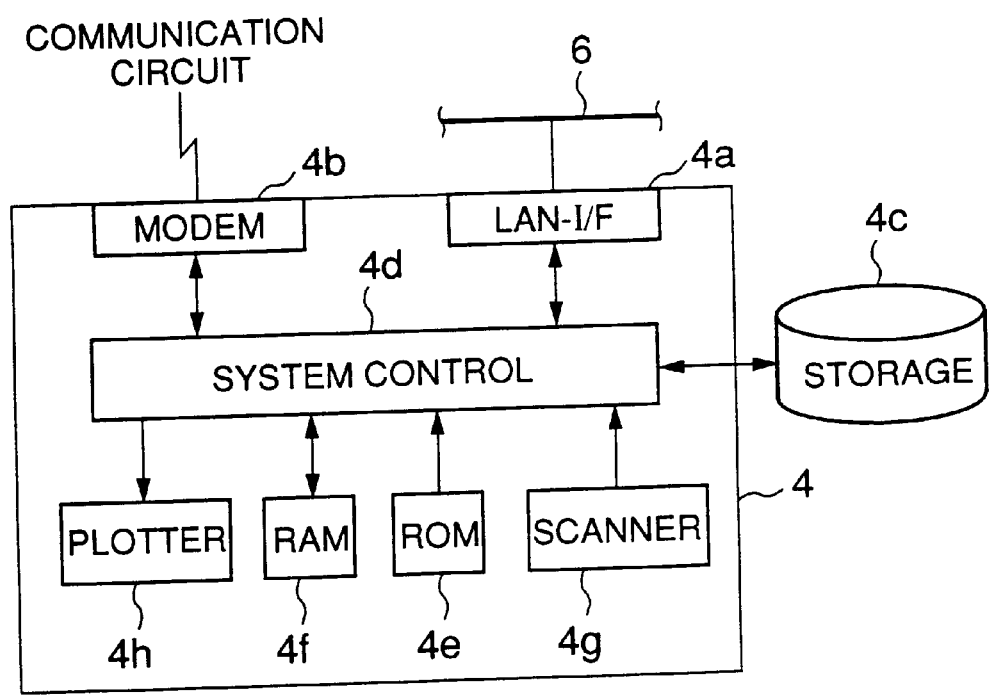
FIG. 3 is a block diagram showing a construction of a network facsimile machine.

FIG. 3 is a block diagram showing a construction of the network facsimile machine 4. The network facsimile machine 5 has the same construction as the network facsimile machine 4.

Referring to FIG. 3, the network facsimile machine 4 comprises a LAN-I/F 4a, a modem 4b, a system controller 4d, a plotter 4h, a RAM 4f, a ROM 4e and a scanner 4g. The LAN-I/F 4a is an interface for connecting the network facsimile machine 4 to the LAN 6. The modem 4b is compatible with modem commands such as Class 1 AT commands and Class 2 AT commands. The system controller 4d is a microcomputer for controlling the components of the network facsimile machine 4. The system controller 4d is involved in facsimile data transmission and reception with a destination terminal and a source terminal over the communication circuit, by issuing a modem control command to the modem 4b and receiving a response message from the modem 4b in reply to the modem control command. Target facsimile data to be transmitted is stored in the storage unit 4c. The facsimile data stored in the storage unit 4c may be the data transferred from the computer terminal 1 via the LAN-I/F 4a and the LAN 6 to the storage unit 4c or the data obtained by the network facsimile machine 4 reading an original using the scanner 4g. The source of the facsimile data does not affect the way the system controller processes the data. The plotter 4h outputs facsimile data received via the modem 4b. The RAM 4f is a work area for the system controller 4d and provides a temporary storage for the data. The ROM 4e stores a program specifying an operational procedure of the system controller 4d. The system controller 4d controls the components of the network facsimile machine 4 in accordance with the procedure written in the ROM 4e.

A description will now be given of how the network facsimile machine receives facsimile data transferred from the computer terminal and transmits the received data to the destination terminal over the communication circuit according to first through fourth embodiments.

The facsimile transmission process according to the first embodiment will be described with reference to FIGS. 4, 5 and 6. In these flowcharts, steps having a prefix T attached thereto are performed by the computer terminal 1 and steps having a prefix F attached thereto are performed by the network facsimile machine 4.

Figure 4:
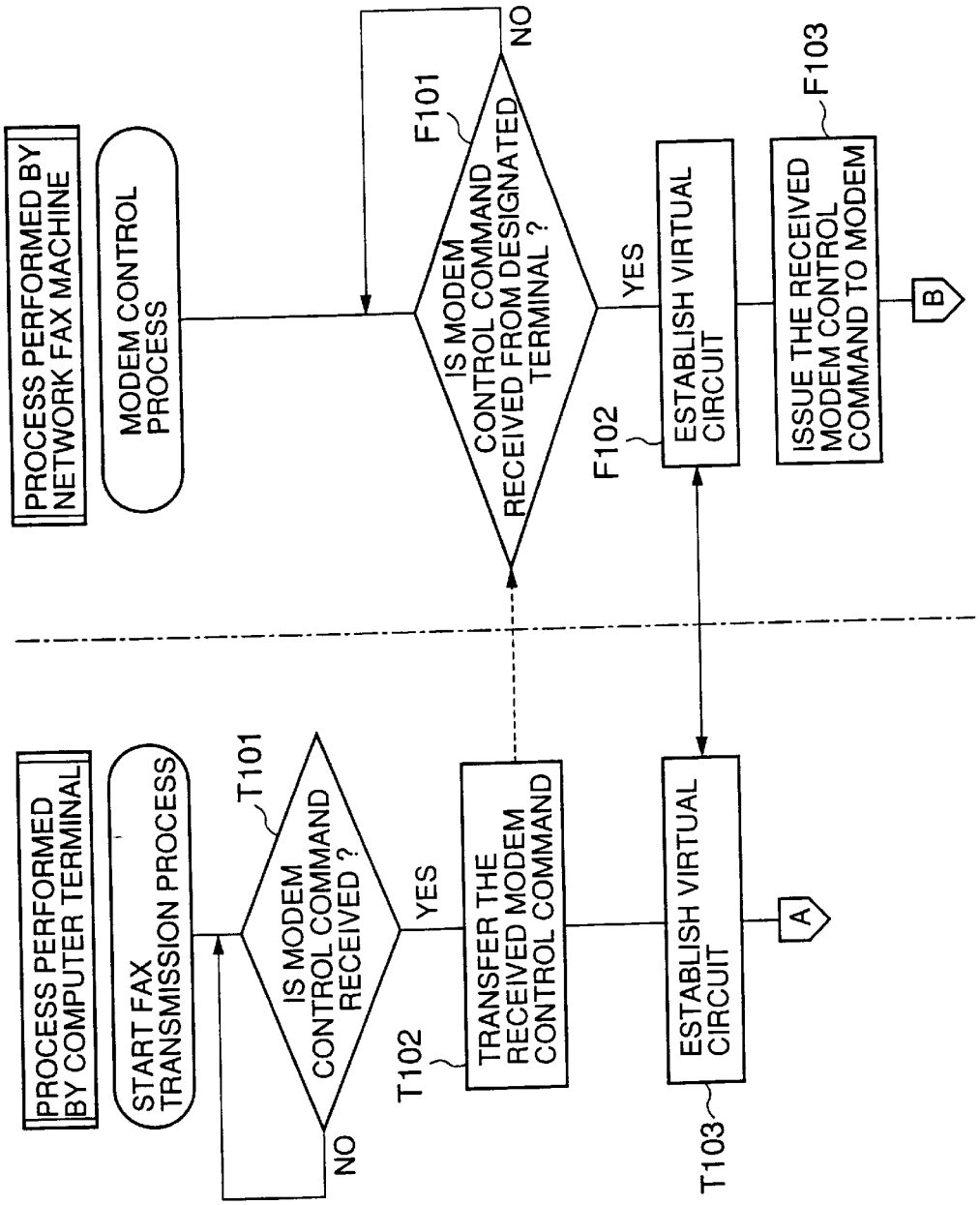
FIGS. 4, 5 and 6 are flowcharts showing a facsimile transmission process according to a first embodiment of the present invention.
Figure 5:
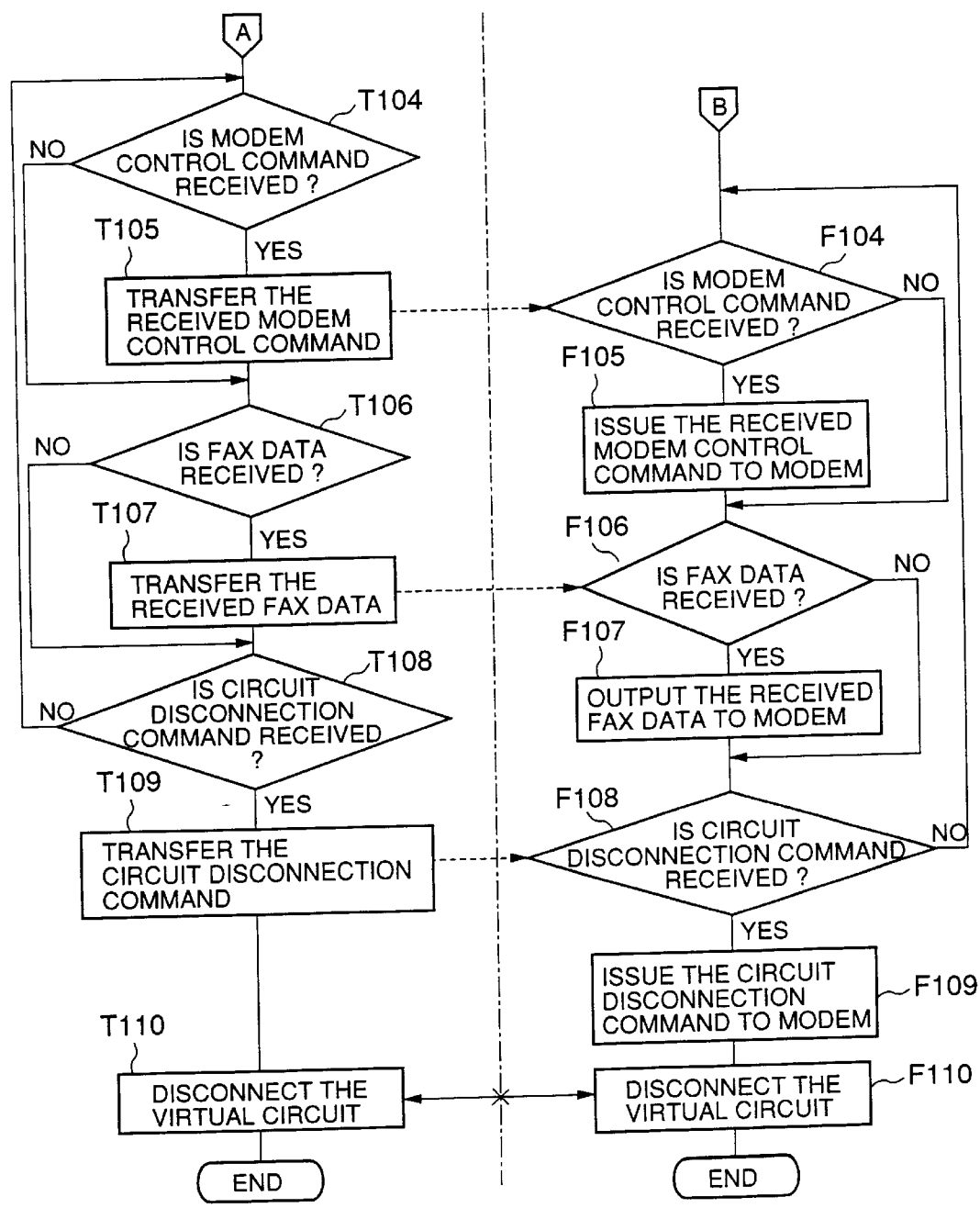
Figure 6:
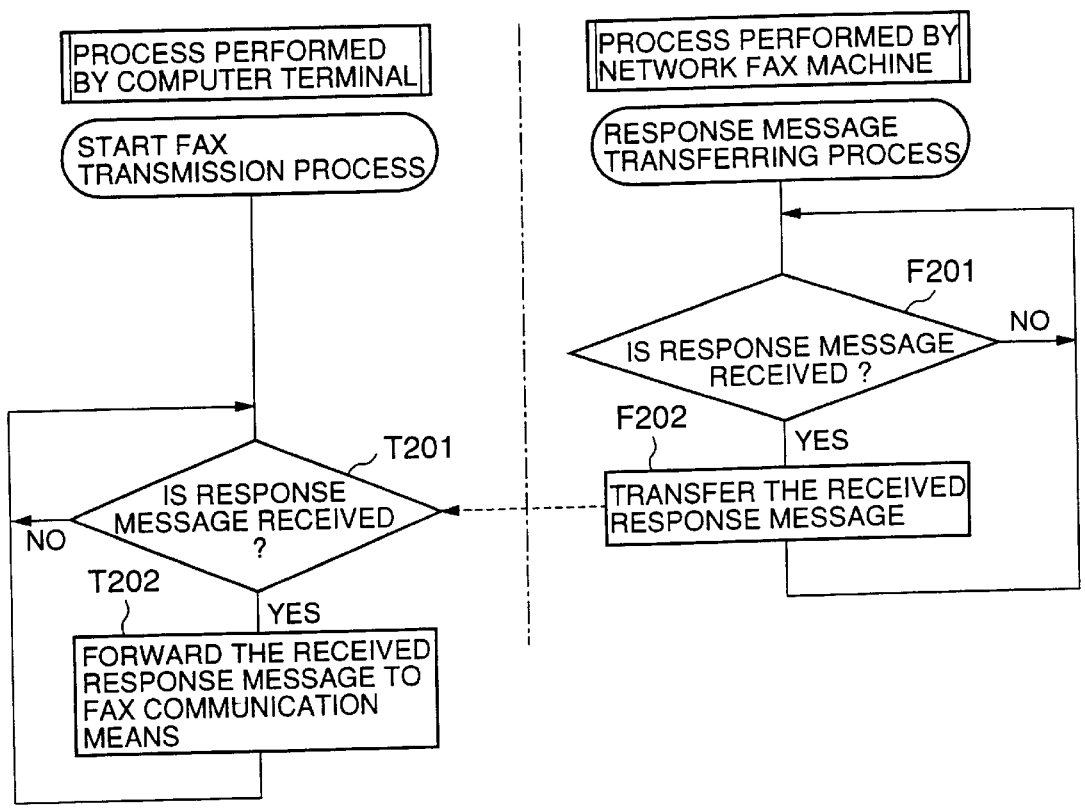

Referring to FIGS. 4, 5 and 6, the facsimile communication means 1d of the computer terminal 1 starts a facsimile transmission process by issuing a modem control command for controlling the modem 7 presumably (from the viewpoint of the facsimile communication means 1d) connected to the communication I/F 1b and outputting target facsimile data for transmission to the communication I/F 1b. The modem control command and the target facsimile data to be transmitted are received by the redirection means 1c and processed thereby as follows.

The redirection means 1c monitors the first modem control command from the facsimile communication means 1d (No loop in step T101). When it is determined that the first modem control command is received (Yes in step T101), the redirection means 1c transfers a packet, including the received modem control command as transmitted data, and having an address of the network facsimile machine 4 as a destination address and an address of the computer terminal 1 as a source address, to the network facsimile machine 4 via the LAN 6 (step T102).

The system controller 4d of the network facsimile machine 4 monitors the modem control command received from a designated computer terminal via the LAN-I/F 4a (No loop in step F101). When it is determined that the first modem control command is received in the form of transmitted data in the packet transferred from the computer terminal 1 in step T102 (Yes in step F101), the system controller 4d examines the source address of the packet so as to determine that the packet has been received from the designated computer terminal (in this case, the computer terminal 1). Thus, the system controller 4d of the network facsimile machine 4 learns that the computer terminal 1 is requesting facsimile data transmission using this machine. Subsequently, a virtual circuit is established between the network facsimile machine 4 and the computer terminal 1 via the LAN 6 (steps T103, F102). The system controller 4d issues the received first modem control command to the modem 4b (step F103). The modem 4b makes no distinction between the modem control command issued directly by the system controller 4d and the modem control command transferred from the computer terminal 1 and issued indirectly by the system controller 4d.

After the virtual circuit is established, the redirection means 1c of the computer terminal 1 monitors the modem control command from the facsimile communication means 1d (No loop in step T104), the facsimile data from the facsimile communication means 1d (No loop in step T106) and the circuit disconnection command (one of the modem control commands) from the facsimile communication means 1d (No loop in step T108). The system controller 4d of the network facsimile machine 4 monitors the modem control command from the computer terminal 1 via the LAN 6 (No loop in step F104), the facsimile data from the computer terminal 1 (No loop in step F106), and the circuit disconnection command (one of the modem control commands) from the computer terminal 1 (No loop in step F108).

When it is determined that the modem control command is received from the facsimile communication means 1d (Yes in step T104), the redirection means 1c transfers the received modem control command to the network facsimile machine 4 (step T105). Associated with this, a Yes determination is made in step F104 in the network facsimile machine 4 so that the system controller 4d issues the modem control command received via the LAN 6 to the modem 4b (step F105).

When it is determined that the facsimile data is received from the facsimile communication means 1d (Yes in step T106), the redirection means 1c transfers the received facsimile data to the network facsimile machine 4 (step T107). Associated with this, a Yes determination is made in step F106 in the network facsimile machine 4 so that the system controller 4d outputs the facsimile data received via the LAN 6 to the modem 4b (step F107).

When it is determined that the circuit disconnection command is received from the facsimile communication means 1d (Yes in step T108), the redirection means 1c transfers the received circuit disconnection command to the network facsimile machine 4 (step T109). Associated with this, a Yes determination is made in step F108 in the network facsimile machine 4 so that the system controller 4d issues the circuit disconnection command received via the LAN 6 to the modem 4b (step F109).

With the process described above, the modem control commands issued by the facsimile communication means 1d of the computer terminal 1 is relayed and issued by the system controller 4d to the modem 4b of the network facsimile machine 4. Similarly, the facsimile data from the facsimile communication means 1d is relayed and output by the system controller 4d to the modem 4b. Subsequent to the arrival of the facsimile data, the modem 4b originates a call to the destination terminal, executes the transmission control procedure such as a pre-transmission procedure and a post-transmission procedure, transmits the facsimile data, and, when the transmission is over, disconnects the circuit connected to the destination terminal using the circuit disconnection command so as to terminate the facsimile transmission.

When the circuit disconnection command is received from the computer terminal 1, the system controller 4d learns that the system controller 4d will no longer receive a modem control command for the current facsimile data transmission. Thereupon, the system controller 4d disconnects the virtual circuit established with respect to the computer terminal 1 via the LAN 6 (step F110). Associated with this, the computer terminal 1 disconnects the virtual circuit (step T110), thus terminating the process.

In the process described above, the modem 4b outputs a response message indicating that the modem control command issued thereto has been executed. Since the modem control command issued to the modem 4b originates in the facsimile communication means 1d of the computer terminal 1, the response message from the modem 4b should be transferred to the facsimile communication means 1d. For this reason, the response message transferring process as shown in FIG. 6 is executed parallel with the process shown in FIGS. 4 and 5.

Referring to FIG. 6, the system controller 4d of the network facsimile machine 4 monitors the response message from the modem 4b (No loop in step F201). When it is determined that the response message has been received (Yes in step F201), a packet having the received response message as data to be transmitted, an address of the computer terminal 1 as a destination address and an address of the network facsimile machine 4 as a source address is sent to the computer terminal 1 via the LAN-I/F 4a and the LAN 6.

The redirection means 1c of the computer terminal 1 monitors the packet containing the response message and arriving via the LAN 6 and the LAN-I/F 1a (No loop in step T201). When it is determined that the response message is received (Yes in step T201), the redirection means 1c forwards the received response message to the facsimile communication means 1d (step T202), and then returns control to step T201.

With this sequence, the response message output by the modem 4b is transferred to the facsimile communication means 1.

Thus, the facsimile communication means 1d of the computer terminal 1 according to the first embodiment invariably views the modem control command and the facsimile data as being issued or output to the modem 7 presumably (from the viewpoint of the facsimile communication means 1d) connected to the communication I/F 1b. The facsimile communication means 1d also invariably processes any response message as being submitted from the modem 7. Therefore, a conventional application (or hardware) for controlling the modem 7 to effect facsimile transmission can be used to implement the facsimile communication means 1d. The network communication system as a whole is constructed such that the facsimile data from the computer terminal 1 is transferred to the network facsimile machine 4 via the LAN 6 so as to be transmitted by the modem 4b to the destination terminal over the communication circuit.

In the example employed to describe the first embodiment, the computer terminal 1 is a facsimile data transmission source and the network facsimile machine 4 assumes a task of transmitting the facsimile data to the destination terminal over the communication circuit. However, other arrangements are also possible. The first embodiment is equally applicable to a combination of the computer terminal 2 and the network facsimile machine 4 and a combination of the computer terminal 1 and the network facsimile machine 5.

A description will now be given, with reference to FIGS. 7, 8 and 9, of the facsimile data transmission process according to the second embodiment. In these flowcharts, steps having a prefix T attached thereto are performed by the computer terminal 1 and steps having a prefix F attached thereto are performed by the network facsimile machine 4.

Figure 7:
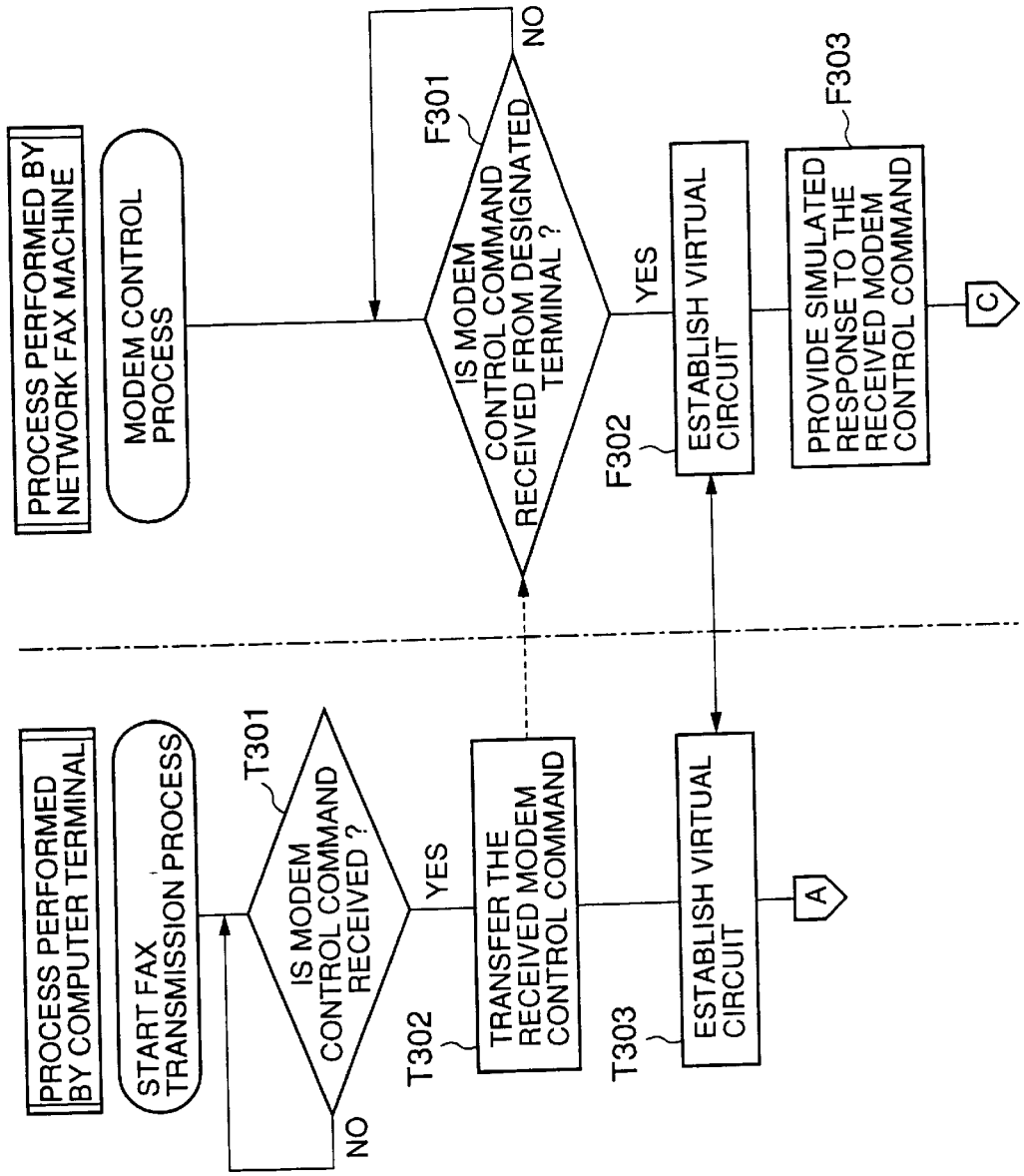
FIGS. 7, 8 and 9 are flowcharts showing a facsimile transmission process according to a second embodiment of the present invention.
Figure 8:
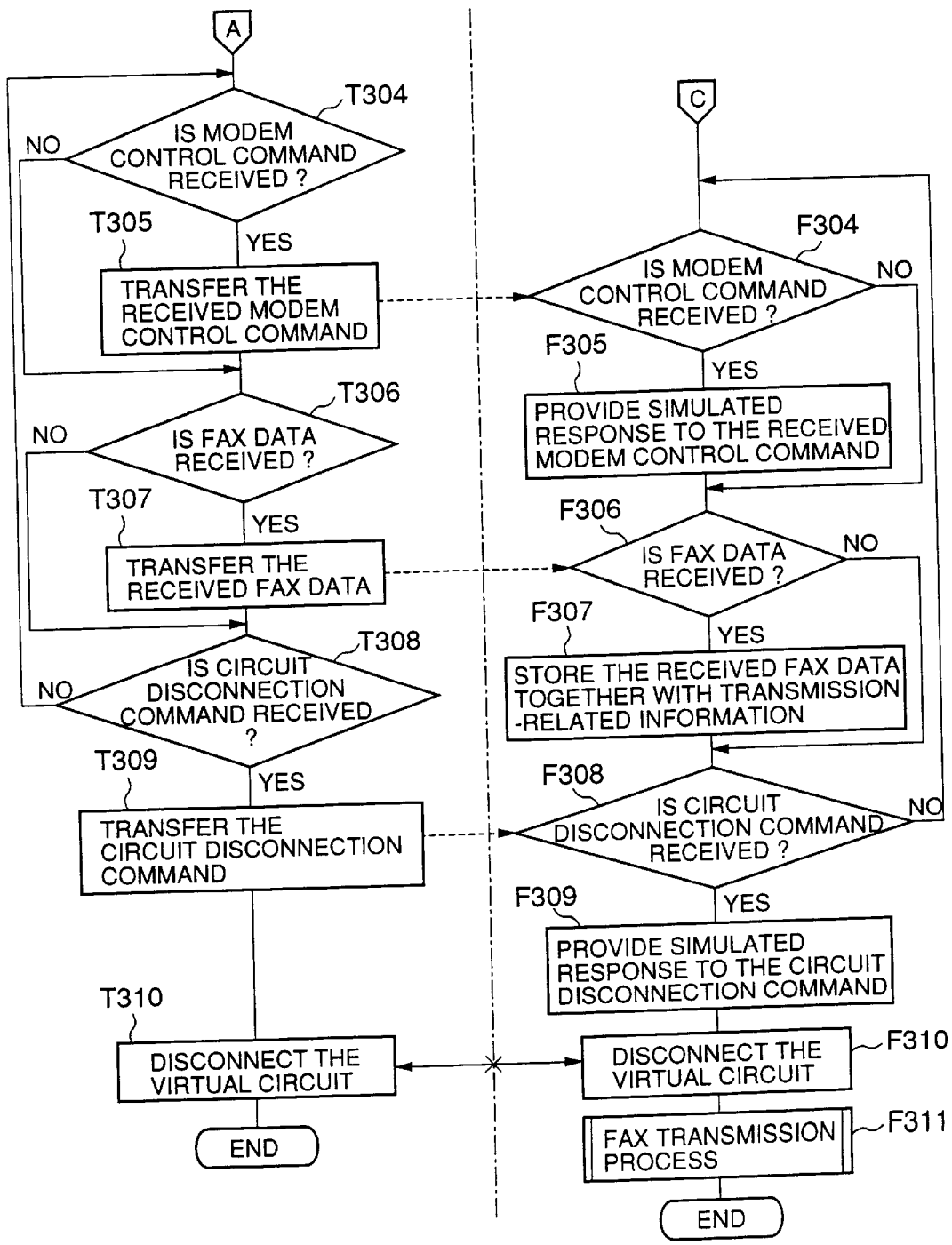
Figure 9:
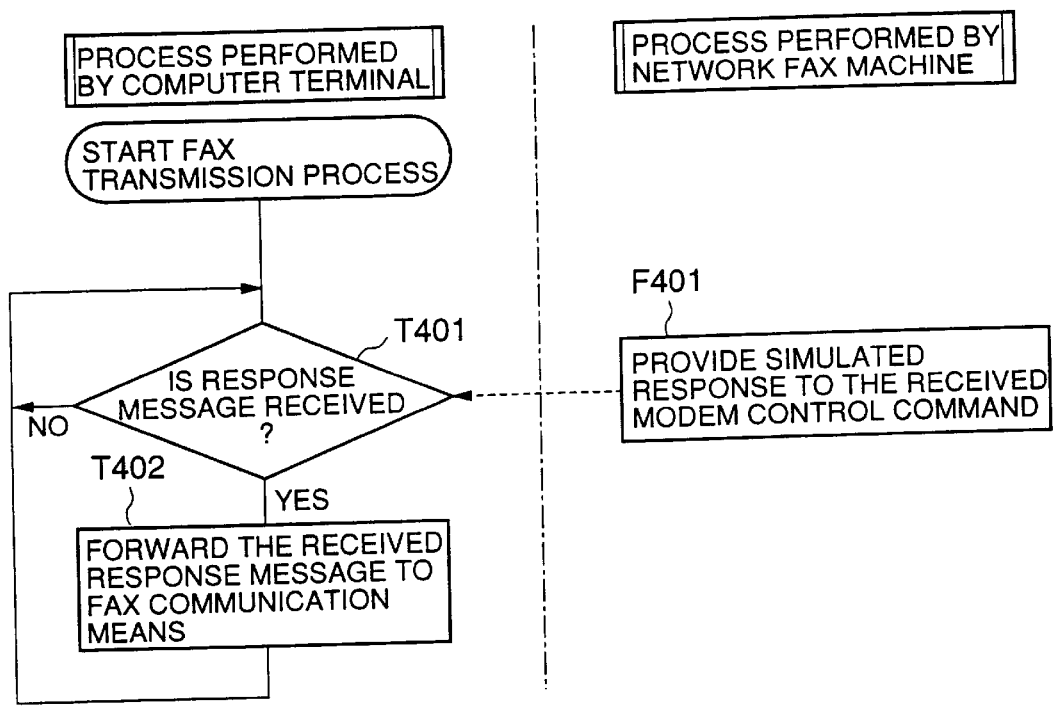

Referring to FIGS. 7, 8 and 9, the facsimile communication means 1d of the computer terminal 1 starts a facsimile transmission process by issuing a modem control command for controlling the modem 7 presumably (from the viewpoint of the facsimile communication means 1d) connected to the communication I/F 1b and outputting facsimile data to be transmitted to the communication I/F 1b. The modem control command and the facsimile data to be transmitted are received by the redirection means 1c and processed thereby as follows.

The redirection means 1c monitors the first modem control command from the facsimile communication means 1d (No loop in step T301). When it is determined that the first modem control command is received (Yes in step T301), the redirection means 1c transfers a packet, including the received modem control command as transmitted data, and having an address of the network facsimile machine 4 as a destination address and an address of the computer terminal 1 as a source address, to the network facsimile machine 4 via the LAN 6 (step T302).

The system controller 4d of the network facsimile machine 4 monitors the modem control command received from a designated computer terminal via the LAN-I/F 4a (No loop in step F301). When it is determined that the first modem control command is received in the form of transmitted data in the packet transferred from the computer terminal 1 in step T102 (Yes in step F301), the system controller 4d examines the source address of the packet so as to determine that the packet has been received from the designated computer terminal (in this case, the computer terminal 1). Thus, the system controller 4*d* of the network facsimile machine 4 learns that the computer terminal 1 is requesting facsimile data transmission using this-machine. Subsequently, a virtual circuit is established between the network facsimile machine 4 and the computer terminal 1 via the LAN 6 (steps T303, F302). The system controller 4*d* provides a simulated response to the received first modem control command (step F303).

The simulated response in step F303 and simulated responses to the modem control command in the subsequent steps are provided so that the network facsimile machine 4 simulates the modem 7 presumably (from the viewpoint of the facsimile communication means 1*d*) connected to the communication I/F 1*b* of the computer terminal 1. The simulated response is transferred to the facsimile communication means 1*d* of the computer terminal 1 according to the process shown in FIG. 9.

Referring to FIG. 9, the system controller 4*d* of the network facsimile machine 4 provides a simulated response to the modem control command received from the computer terminal 1 via the LAN 6 (step T401). More specifically, the system controller 4*d* transfers a packet, including the simulated response as data to be transmitted, an address of the computer terminal 1 as a destination address and an address of the network facsimile machine 4 as a source address, to the computer terminal 1 via the LAN-I/F 4*a* and the LAN 6.

The redirection means 1*c* of the computer terminal 1 monitors the packet containing the response message and arriving via the LAN 6 and the LAN-I/F 1*a* (No loop in step T401). When it is determined that the response message (simulated response) is received (Yes in step T401), the redirection means 1*c* forwards the received response message to the facsimile communication means 1*d* (step T202), and then returns control to step T401.

With this sequence, the simulated response from the system controller 4*d* of the network facsimile machine 4 is transferred to the facsimile communication means 1.

After the virtual circuit is established, the redirection means 1*c* of the computer terminal 1 monitors the modem control command from the facsimile communication means 1*d* (No loop in step T304), the facsimile data from the facsimile communication means 1*d* (No loop in step T306) and the circuit disconnection command (one of the modem control commands) from the facsimile communication means 1*d* (No loop in step T308). The system controller 4*d* of the network facsimile machine 4 monitors the modem control command from the computer terminal 1 via the LAN 6 (No loop in step F304), the facsimile data from the computer terminal 1 (No loop in step F306), and the circuit disconnection command (one of the modem control commands) from the computer terminal 1 (No loop in step F308).

When it is determined that the modem control command is received from the facsimile communication means 1*d* (Yes in step T304), the redirection means 1*c* transfers the received modem control command to the network facsimile machine 4 (step T305). Associated with this, a Yes determination is made in step T304 in the network facsimile machine 4 so that the system controller 4*d* provides a simulated response to the modem control command received via the LAN 6 (step F305).

When it is determined that the facsimile data is received from the facsimile communication means 1*d* (Yes in step T306), the redirection means 1*c* transfers the received facsimile data to the network facsimile machine 4 (step T307). Associated with this, a Yes determination is made in step F306 in the network facsimile machine 4 so that the system controller 4*d* stores the facsimile data received via the LAN 6 in the storage unit 4*c*, together with transmission-related information including a facsimile number of the transmitting machine and obtained from the modem control command transferred from the computer terminal 1 (step F307).

When it is determined that the circuit disconnection command is received from the facsimile communication means 1*d* (Yes in step T308), the redirection means 1*c* transfers the received circuit disconnection command to the network facsimile machine 4 (step T309). Associated with this, a Yes determination is made in step F308 in the network facsimile machine 4 so that the system controller 4*d* provides a simulated response to the circuit disconnection command received via the LAN 6 (step F309).

With the process described above, the system controller 4*d* of the network of the network facsimile machine 4 provides a simulated reception, via the LAN 6, of the modem control commands issued by the facsimile communication means 1*d* of the computer terminal 1. A simulated response is provided to the modem control command subject to the simulated reception, whereupon the facsimile data from the communication means 1*d* of the computer terminal 1 is stored in the storage unit 4*c* of the network facsimile machine 4.

When the circuit disconnection command is received from the computer terminal 1, the system controller 4*d* learns that the system controller 4*d* will no longer receive a modem control command for the current facsimile data transmission. Thereupon, the system controller 4*d* disconnects the virtual circuit established with respect to the computer terminal 1 via the LAN 6 (step F310). Associated with this, the computer terminal 1 disconnects the virtual circuit (step T310). The system controller 4*d* originates a call to a destination terminal of transmission and transmits the facsimile data stored in the storage unit 4*c* to the transmission destination terminal over the communication circuit, using the modem 4*b*, based on the transmission-related information stored with the facsimile data. This transmission process is the same as the process executed by the network facsimile machine 4 to transmit the facsimile data, stored in the storage unit 4*c* and obtained by reading an original by the scanner 4*g* provided in the network facsimile machine 4, to the transmission destination terminal.

Thus, the facsimile communication means 1*d* of the computer terminal 1 according to the second embodiment invariably views the modem control command and the facsimile data as being issued or output to the modem 7 presumably (from the viewpoint of the facsimile communication means 1*d*) connected to the communication I/F 1*b*. The facsimile communication means 1*d* also invariably processes any response message as being submitted from the modem 7. Therefore, a conventional application (or hardware) for controlling the modem 7 to effect facsimile transmission can be used to implement the facsimile communication means 1*d*. The network communication system as a whole is constructed such that the facsimile data from the computer terminal 1 is transferred to the network facsimile machine 4 via the LAN 6 so as to be transmitted by the modem 4*b* to the destination terminal over the communication circuit.

In the example employed to describe the second embodiment, the computer terminal 1 is a facsimile data transmission source and the network facsimile machine 4 assumes a task of transmitting the facsimile data to the destination terminal over the communication circuit.

However, other arrangements are also possible. The second embodiment is equally applicable to a combination of the computer terminal 2 and the network facsimile machine 4 and a combination of the computer terminal 1 and the network facsimile machine 5.

The facsimile data transferred to the network facsimile machine 4 is temporarily stored in the storage unit 4c before being sequentially read out and transmitted to the destination of transmission. Therefore, a plurality of simultaneous requests for transmission of facsimile data from respective computer terminals on the LAN 6 can be processed.

Figure 10:
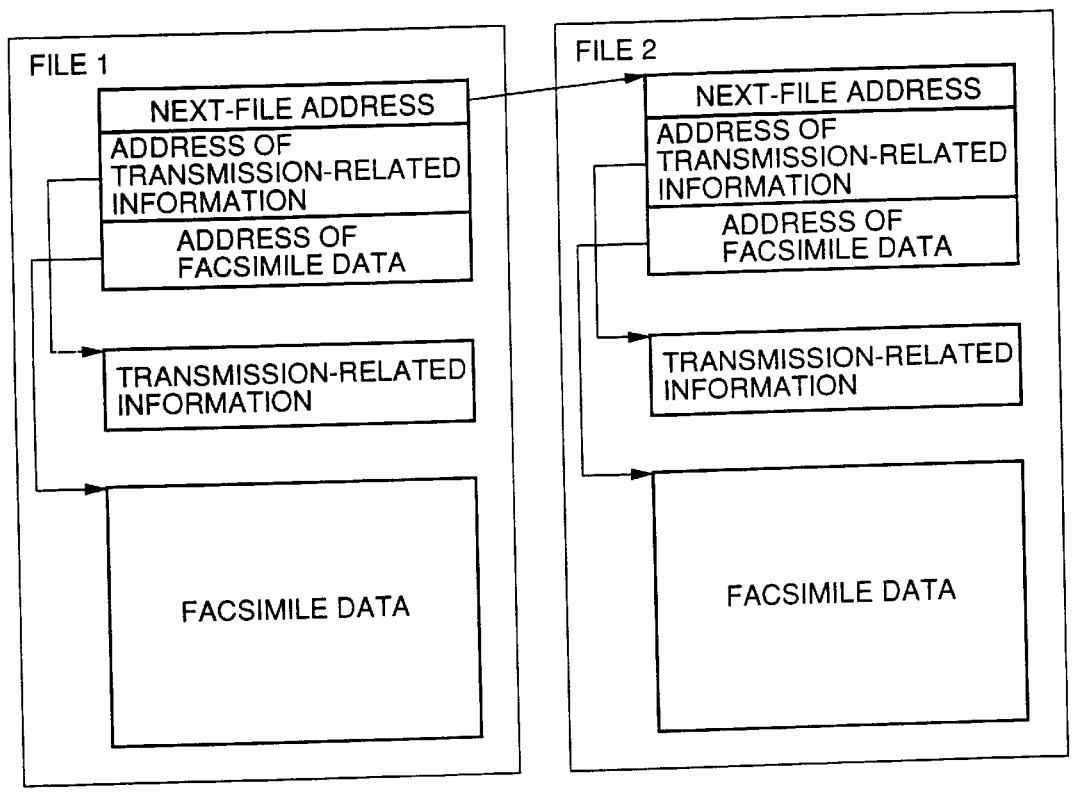
FIG. 10. shows a construction of a file received by a network facsimile machine from the computer terminal.

For example, while the network facsimile machine 4 is receiving the facsimile data from the computer terminal 1 in the form of a file 1 as shown in FIG. 10, the network facsimile machine 4 may receive a request from the computer terminal 2 for transfer of facsimile data. In this case, the network facsimile machine 4 takes advantage of a well-known multi-task feature to accept the additional transfer request so as to receive the facsimile data from the computer terminal 2 in the form of a file 2 as shown in FIG. 10. When the facsimile data has been received, the associated files are closed. The file 1 and the file 2 are successively read out from the storage unit 4c so that the modem 4b is controlled to transmit the facsimile data to the relevant destination terminals.

A description will now be given, with reference to FIG. 10, of a construction of the file 1 and the file 2. Referring to FIG. 10, header information of each of the file 1 and the file 2 includes a next-file address indicating an address of a next file to be processed, an address of the transmission-related information and an address of the facsimile data. Main information of each of the file 1 and the file 2 includes the transmission-related information and the facsimile data. The file to be processed subsequent to the file 1, that is, the file 2 is identified by the next-file address specified in the file 1. Of course, requests for facsimile data transmission simultaneously received from multiple computer terminals can be processed by adding files subsequent to the last file to be processed.

A description will now be given, with reference to FIG. 11, of the facsimile data transmission process according to a third embodiment of the present invention. In these flowcharts, steps having a prefix T attached thereto are performed by the computer terminal 1 or the computer terminal 2 and steps having a prefix F attached thereto are performed by the network facsimile machine 4.

Figure 11:
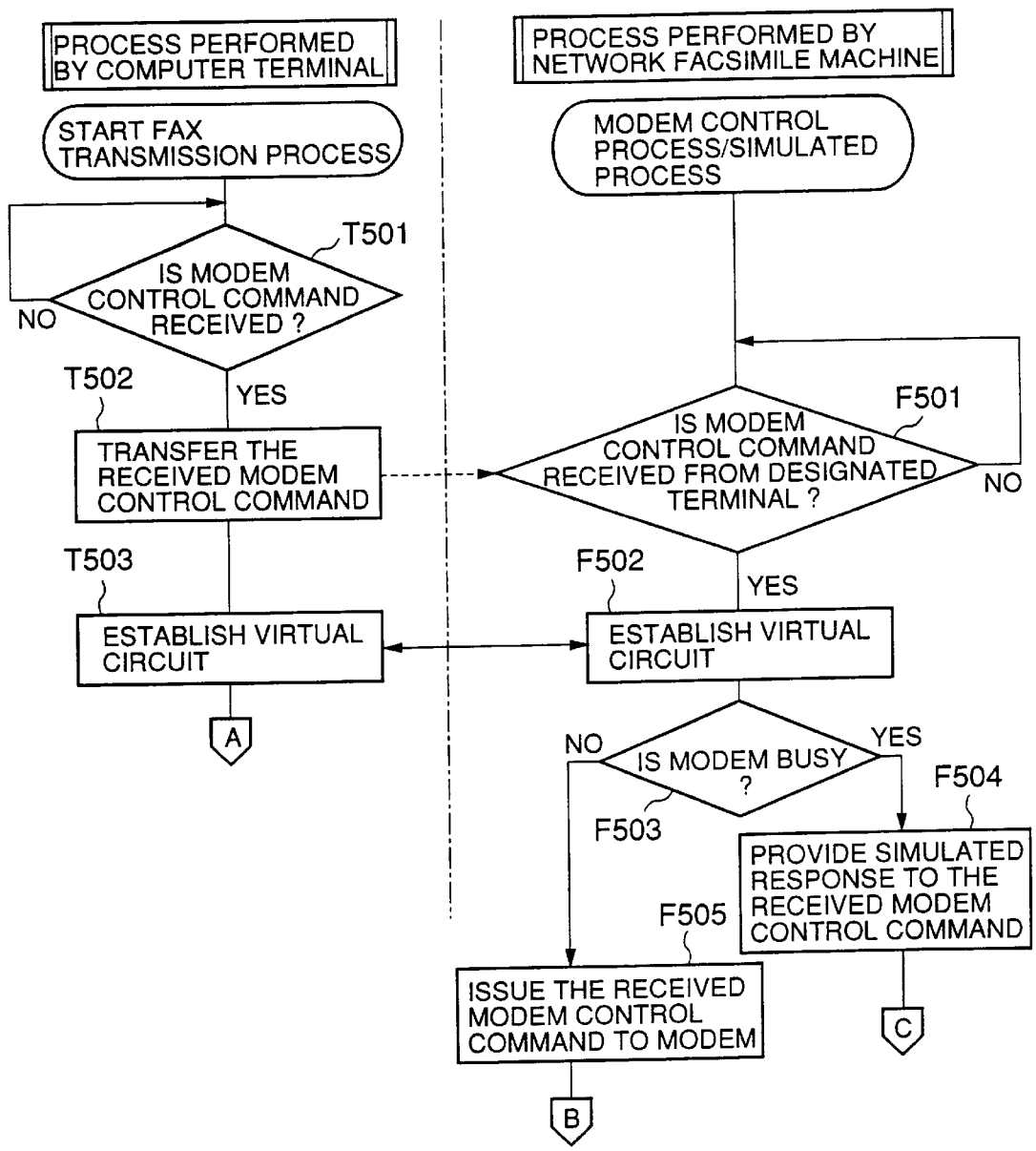
FIG. 11. is a flowchart showing a facsimile transmission process according to a third embodiment of the present invention.

Referring to FIG. 11, the facsimile communication means 1d of the computer terminal 1 and/or the facsimile communication means 1d of the computer terminal 2 starts a facsimile transmission by issuing a modem control command for controlling the modem 7 presumably (from the viewpoint of the facsimile communication means 1d) connected to the communication I/F 1b and by outputting facsimile data to the communication I/F 1b. The modem control command and the facsimile data to be transmitted are received by the redirection means 1c and processed thereby as follows.

The redirection means 1c monitors the first modem control command from the facsimile communication means 1d (No in step T501). When it is determined that the first modem control command is received (Yes in step T501), the redirection means 1c transfers a packet, including the received modem control command as data transmitted to be transmitted, an address of the network facsimile machine 4 as a destination address and an address of the computer terminal 1 or the computer terminal 2 as a source address, to the network facsimile machine 4 via the LAN 6 (step T502).

The system controller 4d of the network facsimile machine 4 monitors the modem control command received from a designated computer terminal via the LAN-I/F 4a (No loop in step F501). When it is determined that the first modem control command is received in the form of transmitted data in the packet transferred from the computer terminal 1 or the computer terminal 2 in step T502 (Yes in step F501), the system controller 4d examines the source address of the packet so as to determine that the packet has been received from the designated computer terminal (the computer terminal 1 or the computer terminal 2). Thus, the system controller 4d of the network facsimile machine 4 learns that the computer terminal 1 or the computer terminal 2 is requesting facsimile data transmission using this-machine. Subsequently, a virtual circuit is established between the network facsimile machine 4, and the computer terminal 1 or the computer terminal 2 via the LAN 6 (steps T503, F502). The system controller 4d then determines whether or not the modem 4b is busy (step F503).

If the modem 4b is not busy (No in step F503), the system controller 4d issues the received first modem control command to the modem 4b (step F505). The modem 4b makes no distinction between the modem control command issued directly by the system controller 4d and the modem control command transferred from the computer terminal 1 and issued indirectly by the system controller 4d.

When the modem 4b is busy (Yes in step F503), the system controller 4d provides a simulated response to the received first modem control command as in the second embodiment (step F504).

More specifically, when the modem 4b is not busy (No in step F503), the computer terminal 1 or the computer terminal 2 turns control to step T104 of the first embodiment after step T503. The network facsimile machine 4 turns control to step F104 of the first embodiment after step F505. The process of the first embodiment shown in FIG. 6 is also performed. When the modem 4b is busy (Yes in step F503), the computer terminal 1 or the computer terminal 2 turns control to step T304 of the second embodiment after step T503. The network facsimile machine 4 turns control to step F304 of the second embodiment after step 504. The process of the second embodiment shown in FIG. 9 is also performed.

According to the third embodiment described above, the network facsimile machine 4 requested by the computer terminal 1 or the computer terminal 2 to transmit facsimile data does not store facsimile data from the computer terminal 1 or the computer terminal 2 in the storage unit 4c, when the modem 4b is not busy. Instead, the facsimile data is immediately transmitted by the modem 4b to a destination terminal over the communication circuit. Such an arrangement differs from the second embodiment in which the facsimile data from the computer terminal 1 is stored in the storage unit 4c before being transmitted irrespective of whether or not the modem 4b is busy. Thus, the third embodiment ensures facsimile data transmission with little time delay.

When the network facsimile machine 4 has received a request for facsimile data transmission from the computer terminal 2 while directing the modem control command or facsimile data from the computer terminal 1 to the modem 4b, that is, while the modem 4b is busy, the network facsimile machine 4 performs steps F501 and F502 by taking advantage of a well-known multi-task feature so as to accept the request. Similarly to the second embodiment, the network facsimile machine 4 stores the facsimile data in the storage unit 4c. When the facsimile data transmission for the computer terminal 1 is completed, the facsimile data in the storage unit 1 is read out so as to be transmitted to the destination terminal. In this way, the network facsimile machine 4 is capable of processing facsimile data transmission requests occurring simultaneously from a plurality of computer terminals.

Figure 12:
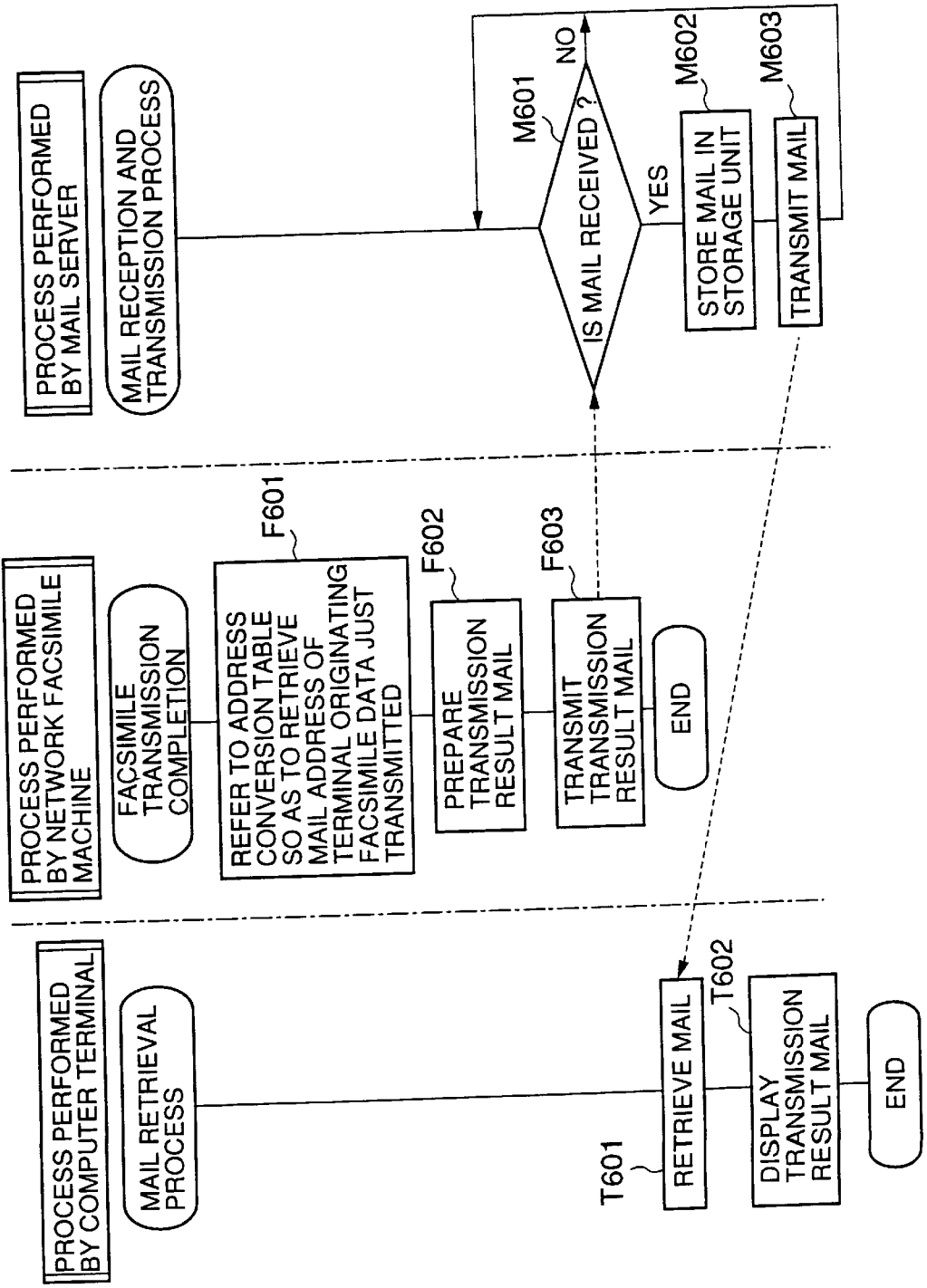
FIG. 12 is a flowchart showing a facsimile transmission process according to a fourth embodiment of the present invention.

A description will now be given, with reference to FIG. 12, of the facsimile data transmission process according to a fourth embodiment of the present invention. In FIG. 12, steps having a prefix T attached thereto are performed by the computer terminal 1 or the computer terminal 2, steps having a prefix F attached thereto are performed by the network facsimile machine 4, and steps having a prefix M attached thereto are performed by the mail server 3.

The process according to the fourth embodiment is performed by the network facsimile machine 4 after transmitting the facsimile data received from the computer terminal 1 or the computer terminal 2.

The fourth embodiment assumes that the network facsimile machine 4 stores an address conversion table as shown in FIG. 13 in the storage unit 4c. The address conversion table lists source identification for the computer terminals, and mail addresses of the computer terminals, in such a way as to relate the source identification information to the corresponding mail address. In the G3 facsimile protocol, source identification information is sent to a destination machine using a control signal TS1 originated by each source machine. Thus, the source identification information is included in the modem control command transferred from the computer terminals 1 and 2. The network facsimile machine 4 obtains the source identification information by examining the modem control command from the computer terminals 1 and 2.

Referring to FIG. 12, when the system controller 4d of the network facsimile machine 4 has transmitted facsimile data forwarded from a designated computer terminal (in this case, the computer terminal 1 is assumed), to a destination machine, the system controller 4d refers to the address conversion table as shown in FIG. 13 so as to retrieve a mail address that corresponds to the source identification information obtained by examining the modem control command transferred from the computer terminal 1 (step F601). The network controller 4d then prepares an electronic mail message for reporting the result of transmission (step F602). The electronic mail message may include information relating to whether the transmission is successful or is abnormally terminated, information relating to a cause of the abnormal termination (for example, a busy status or no response), or information relating a duration of communication. The system controller 4d transmits the electronic mail message to the destination indicated by the mail address obtained in step F601 via the LAN-I/F 4a (step F603).

The mail server 3 monitors electronic mail messages (step M601). If a Yes determination is made in step M601 as a result of the transmission in step F603, the mail server 3 receives the electronic mail message from the network facsimile machine 4 just as it receives any other electronic mail message. The mail server 3 then stores the received electronic mail message in the storage unit 3b (step M602) and then sends the stored mail to the destination computer terminal 1 (step M603). The computer terminal 1 retrieves the message (step T601) so as to display it on a display monitor coupled thereto (step T602). In this way, the user of the computer terminal 1 can indirectly know the result of transmission by the network facsimile machine 4.

The description above assumes a case where the facsimile data from the computer terminal is transferred to the network facsimile machine via the LAN so that the network facsimile machine transmits the facsimile data to a destination terminal over the communication circuit. Of course, the present invention may equally be applied to a case where data binary data or text data is transmitted from the computer terminal to a data communication terminal via the LAN so that the data communication terminal transmits the data to a destination terminal over the communication circuit.

The present invention is not limited to the above described embodiments, and variations and modifications may be made without departing from the scope of the present invention.

What is claimed is:

1. A network communication system for causing a source communication terminal on a network to transfer data via said network to a designated communication terminal on said network, and for causing said designated communication terminal to transmit said transferred data to a destination communication terminal via a communication circuit, wherein said source communication terminal comprises:
a communication interface;
a first modem connected to said communication circuit and said communication interface;
data communication means for controlling said first modem so as to perform data communication, said data communication means issuing a modem control command and target data for transmission to said first modem;
a first network interface connected to said network; and
redirection means connected to said communication interface, said data communication means, and said first network interface for monitoring said data communication means for the target data for transmission and the modem control command being issued by said data communication means to said first modem, and for redirecting said target data and said modem control command being issued by said data communication means to said first modem to said designated communication terminal via said first network interface, and for transferring a response message returned by said designated communication terminal in reply to said modem control command via said first network interface to said data communication means, and said designated communication terminal comprises:
a second modem connected to said communication circuit;
a second network interface connected to said network; and
modem controlling means for outputting said target data for transmission and said modem control command redirected by said redirection means via said network to said second modem, and for transferring a response message returned by said second modem in reply to said modem control command from said source communication terminal to said source communication terminal via said second network interface.

2. The network communication system as claimed in claim 1, wherein said designated communication terminal further comprises:
a correspondence table for listing source identification information identifying said source communication terminal and mail addresses in such a way as to relate said source identification information to a corresponding mail address; and transmission result mail transmitting means for preparing an electronic mail message that includes a result of transmission of said target data for transmission to said destination communication terminal, for referring to said correspondence table to retrieve a mail address that corresponds to said source identification information obtained by examining said modem control command transferred from said source communication terminal via said first network interface, and for sending said electronic mail message to said mail address thus retrieved.

3. A network communication system for causing a source communication terminal on a network to transfer data via said network to a designated communication terminal on said network, and for causing said designated communication terminal to transmit said transferred data to a destination communication terminal via a communication circuit, wherein said source communication terminal comprises:
 a communication interface;
 a first modem connected to said communication circuit and said communication interface;
 data communication means for controlling said first modem so as to perform data communication, said data communication means issuing a modem control command and target data for transmission to said first modem;
 a first network interface connected to said network; and
 redirection means connected to said communication interface, said data communication means, and said first network interface for monitoring said data communication means for the target data for transmission and the modem control command being issued by said data communication means to said first modem, and for redirecting said target data and said modem control command being issued by said data communication means to said first modem, to said designated communication terminal via said first network interface, and for transferring a response message returned by said designated communication terminal in reply to said modem control command via said first network interface to said data communication means, and said designated communication terminal comprises:
 a second modem connected to said communication circuit;
 a second network interface connected to said network; and
 modem simulating means for receiving said target data for transmission and said modem control command redirected by said redirection means via said network, for transferring a simulated reply message in reply to said modem control command to said source communication terminal via said second network interface, for storing said target data for transmission in a storage unit together with transmission-related information obtained from said modem control command, and for transmitting said target data for transmission stored in said storage unit to said destination communication terminal via said communication circuit by controlling said second modem in accordance with said transmission-related information.

4. The network communication system as claimed in claim 3, wherein said designated communication terminal further comprises:

a correspondence table for listing source identification information identifying said source communication terminal and mail addresses in such a way as to relate said source identification information to a corresponding mail address; and transmission result mail transmitting means for preparing an electronic mail message that includes a result of transmission of said target data for transmission to said destination communication terminal, for referring to said correspondence table to retrieve a mail address that corresponds to said source identification information obtained by examining said modem control command transferred from said source communication terminal via said first network interface, and for sending said electronic mail message to said mail address thus retrieved.

5. A network communication system for causing a source communication terminal on a network to transfer data via said network to a designated communication terminal on said network, and for causing said designated communication terminal to transmit said transferred data to a destination communication terminal via a communication circuit, wherein said source communication terminal comprises:
 a communication interface;
 a first modem connected to said communication circuit and said communication interface;
 data communication means for controlling said first modem so as to perform data communication, said data communication means issuing a modem control command and target data for transmission to said first modem;
 a first network interface connected to said network; and
 redirection means connected to said communication interface, said data communication means, and said first network interface for monitoring said data communication means for the target data for transmission and the modem control command being issued by said data communication means to said first modem, and for redirecting said target data and said modem control command being issued by said data communication means to said first modem, to said designated communication terminal via said first network interface, and for transferring a response message returned by said designated communication terminal in reply to said modem control command via said first network interface to said data communication means, and said designated communication terminal comprises:
 a second modem connected to said communication circuit;
 a second network interface connected to said network; and
 modem controlling and simulating means for outputting, when said second modem is not busy, said target data for transmission and said modem control command redirected by said redirection means via said network to said second modem, for transferring, when said second modem is not busy, a response message returned by said second modem to said source communication terminal in reply to said modem control command from said source communication terminal via said network interface, for receiving, when said second modem is busy, said target data for transmission and said modem control command redirected by said redirection means via said network, for transferring, when said second modem is busy, a simulated reply message in reply to said modem control command to said source communication terminal via said second network interface, for storing, when said second modem is busy, said target data for transmission in a storage unit together with transmission-related information obtained from said modem control command, and for transmitting, when said second modem is busy, said target data for transmission stored in said storage unit to said destination communication terminal via said communication circuit by controlling said second modem in accordance with said transmission-related information.

6. The network communication system as claimed in claim 5, wherein said designated communication terminal further comprises:
   a correspondence table for listing source identification information identifying said source communication terminal and mail addresses in such a way as to relate said source identification information to a corresponding mail address; and
   transmission result mail transmitting means for preparing an electronic mail message that includes a result of transmission of said target data for transmission to said destination communication terminal, for referring to said correspondence table to retrieve said mail address that corresponds to said source identification information obtained by examining said modem control command transferred from said source communication terminal via said first network interface, and for sending said electronic mail message to said mail address thus retrieved.

7. A network communication system for causing a source communication terminal on a network to transfer data via said network to a designated communication terminal on said network, and for causing said designated communication terminal to transmit said transferred data to a destination communication terminal via a communication circuit, wherein
   said source communication terminal comprises:
      a communication interface circuit;
      a first modem circuit connected to said communication circuit and said communication interface circuit;
      a data communication circuit for controlling said first modem circuit so as to perform data communication, said data communication circuit issuing a modem control command and target data for transmission to said first modem circuit;
      a first network interface circuit connected to said network; and
      a redirection circuit connected to said communication interface circuit, said data communication circuit, and said first network interface circuit for monitoring said data communication circuit for the target data for transmission and the modem control command being issued by said data communication circuit to said first modem circuit, and for redirecting said target data and said modem control command being issued by said data communication circuit to said first modem circuit, to said designated communication terminal via said first network interface circuit, and for transferring a response message returned by said designated communication terminal in reply to said modem control command via said first network interface circuit to said data communication circuit, and
   said designated communication terminal comprises:
      a second modem circuit connected to said communication circuit;
      a second network interface circuit connected to said network; and
      a modem controlling circuit for outputting said target data for transmission and said modem control command redirected by said redirection circuit via said network to said second modem circuit, and for transferring a response message returned by said second modem circuit in reply to said modem control command from said source communication terminal to said source communication terminal via said second network interface circuit.

8. The network communication system as claimed in claim 7, wherein said designated communication terminal further comprises:
   a correspondence table for listing source identification information identifying said source communication terminal and mail addresses in such a way as to relate said source identification information to a corresponding mail address; and
   a transmission result mail transmitting circuit for preparing an electronic mail message that includes a result of transmission of said target data for transmission to said destination communication terminal, for referring to said correspondence table to retrieve a mail address that corresponds to said source identification information obtained by examining said modem control command transferred from said source communication terminal via said first network interface circuit, and for sending said electronic mail message to said mail address thus retrieved.

9. A network communication system for causing a source communication terminal on a network to transfer data via said network to a designated communication terminal on said network, and for causing said designated communication terminal to transmit said transferred data to a destination communication terminal using a communication circuit, wherein
   said source communication terminal comprises:
      a communication interface circuit;
      a first modem circuit connected to said communication circuit and said communication interface circuit;
      a data communication circuit for controlling said first modem circuit so as to perform data communication, said data communication circuit issuing a modem control command and target data for transmission to said first modem circuit;
      a first network interface circuit connected to said network; and
      a redirection circuit connected to said communication interface circuit, said data communication circuit, and said first network interface circuit for monitoring said data communication circuit for the target data for transmission and the modem control command being issued by said data communication circuit to said first modem, and for redirecting said target data and said modem control command being issued by said data communication circuit to said first modem circuit, to said designated communication terminal via said first network interface circuit, and for transferring a response message returned by said designated communication terminal in reply to said modem control command via said first network interface circuit to said data communication circuit, and
   said designated communication terminal comprises:

a second modem circuit connected to said communication circuit;

a second network interface circuit connected to said network; and a modem simulating circuit for receiving said target data for transmission and said modem control command redirected by said redirection circuit via said network, for transferring a simulated reply message in reply to said modem control command to said source communication terminal via said second network interface circuit, for storing said target data for transmission in a storage unit together with transmission-related information obtained from said modem control command, and for transmitting said target data for transmission stored in said storage unit to said destination communication terminal via said communication circuit by controlling said second modem circuit in accordance with said transmission-related information.

10. The network communication system as claimed in claim 9, wherein said designated communication terminal further comprises:

a correspondence table for listing source identification information identifying said source communication terminal and mail addresses in such a way as to relate said source identification information to a corresponding mail address; and a transmission result mail transmitting circuit for preparing an electronic mail message that includes a result of transmission of said target data for transmission to said destination communication terminal, for referring to said correspondence table to retrieve a mail address that corresponds to said source identification information obtained by examining said modem control command transferred from said source communication terminal via said first network interface circuit, and for sending said electronic mail message to said mail address thus retrieved.

11. A network communication system for causing a source communication terminal on a network to transfer data via said network to a designated communication terminal on said network, and for causing said designated communication terminal to transmit said transferred data to a destination communication terminal via a communication circuit, wherein said source communication terminal comprises:

a communication interface circuit;

a first modem circuit connected to said communication circuit and said communication interface circuit;

a data communication circuit for controlling said first modem circuit so as to perform data communication, said data communication circuit issuing a modem control command and target data for transmission to said first modem circuit;

a first network interface circuit connected to said network; and a redirection circuit connected to said communication interface circuit, said data communication circuit, and said first network interface circuit for monitoring said data communication circuit for the target data for transmission and the modem control command being issued by said data communication circuit to said first modem circuit, and for redirecting said target data and said modem control command being issued by said data communication circuit to said first modem circuit, to said designated communication terminal via said first network interface circuit, and for transferring a response message returned by said designated communication terminal in reply to said modem control command via said first network interface circuit to said data communication circuit, and said designated communication terminal comprises:

a second modem circuit connected to said communication circuit;

a second network interface circuit connected to said network; and a modem controlling and simulating circuit for outputting, when said second modem circuit is not busy, said target data for transmission and said modem control command redirected by said redirection circuit via said network to said second modem circuit, for transferring, when said second modem circuit is not busy, a response message returned by said second modem circuit to said source communication terminal in reply to said modem control command from said source communication terminal via said second network interface circuit, for receiving, when said second modem circuit is busy, said target data for transmission and said modem control command redirected by said redirection circuit via said network, for transferring, when said second modem circuit is busy, a simulated reply message in reply to said modem control command to said source communication terminal via said second network interface circuit, for storing, when said second modem circuit is busy, said target data for transmission in a storage unit together with transmission-related information obtained from said modem control command, and for transmitting, when said second modem circuit is busy, said target data for transmission stored in said storage unit to said destination communication terminal via said communication circuit by controlling said second modem circuit in accordance with said transmission-related information.

12. The network communication system as claimed in claim 11, wherein said designated communication terminal further comprises:

a correspondence table for listing source identification information identifying said source communication terminal and mail addresses in such a way as to relate said source identification information to a corresponding mail address; and a transmission result mail transmitting circuit for preparing an electronic mail message that includes a result of transmission of said target data for transmission to said destination communication terminal, for referring to said correspondence table to retrieve said mail address that corresponds to said source identification information obtained by examining said modem control command transferred from said source communication terminal via said first network interface circuit, and for sending said electronic mail message to said mail address thus retrieved.

13. A network communication method for transferring data from a source communication terminal on a network via said network to a designated communication terminal on said network, and for transmitting said transferred data from said designated communication terminal to a destination communication terminal via a communication circuit, wherein at said source communication terminal said method comprises the steps of:

providing a first modem circuit connected with said communication circuit and a communication interface circuit;
controlling said first modem circuit with a data communication circuit so as to perform data communication, said controlling step issuing a modem control command and target data for transmission to the first modem circuit;
monitoring for the target data for transmission and the modem control command being issued by said data communication circuit to said first modem circuit using a redirection circuit connected to said communication interface circuit, said data communication circuit, and a first network interface circuit connected to said network;
redirecting said target data and said modem control command being issued during said controlling step to said first modem circuit, to said designated communication terminal via said first network interface circuit; and
transferring a response message returned by said designated communication terminal in reply to said modem control command via said first network interface circuit to said data communication circuit, and
at said designated communication terminal said method comprises the steps of:
outputting said target data for transmission and said modem control command redirected by said redirection circuit via said network to a second modem circuit connected to said communication circuit; and
transferring a response message returned by said second modem circuit in reply to said modem control command from said source communication terminal to said source communication terminal via said second network interface circuit connected to said network.

14. The network communication method as claimed in claim 13, wherein at said designated communication terminal said method further comprises the steps of:
providing a correspondence table for listing source identification information identifying said source communication terminal and mail addresses in such a way as to relate said source identification information to a corresponding mail address;
preparing an electronic mail message that includes a result of transmission of said target data for transmission to said destination communication terminal;
referring to said correspondence table to retrieve a mail address that corresponds to said source identification information obtained by examining said modem control command transferred from said source communication terminal via said first network interface circuit; and
sending said electronic mail message to said mail address thus retrieved.

15. A network communication method for transferring data from a source communication terminal on a network via said network to a designated communication terminal on said network, and for transmitting said transferred data from said designated communication terminal to a destination communication terminal via a communication circuit, wherein
at said source communication terminal said method comprises the steps of:
providing a first modem circuit connected with said communication circuit and a communication interface circuit;
controlling said first modem circuit with a data communication circuit so as to perform data communication, said controlling step issuing a modem control command and target data for transmission to the first modem circuit;
monitoring for the target data for transmission and the modem control command being issued by said data communication circuit to said first modem circuit using a redirection circuit connected to said communication interface circuit, said data communication circuit, and a first network interface circuit connected to said network;
redirecting said target data and said modem control command being issued during said controlling step to said first modem circuit, to said designated communication terminal via said first network interface circuit; and
transferring a response message returned by said designated communication terminal in reply to said modem control command via said first network interface circuit to said data communication circuit, and
at said designated communication terminal said method comprises the steps of:
receiving said target data for transmission and said modem control command redirected by said redirection circuit via said network;
transferring a simulated reply message in reply to said modem control command to said source communication terminal via a second network interface circuit connected to said network;
storing said target data for transmission in a storage unit together with transmission-related information obtained from said modem control command; and
transmitting said target data for transmission stored in said storage unit to said destination communication terminal via said communication circuit by controlling said second modem circuit in accordance with said transmission-related information.

16. The network communication method as claimed in claim 15, wherein at said designated communication terminal said method further comprises the steps of:
preparing a correspondence table for listing source identification information identifying said source communication terminal and mail addresses in such a way as to relate said source identification information to a corresponding mail address;
preparing an electronic mail message that includes a result of transmission of said target data for transmission to said destination communication terminal;
referring to said correspondence table to retrieve a mail address that corresponds to said source identification information obtained by examining said modem control command transferred from said source communication terminal via said first network interface circuit; and
sending said electronic mail message to said mail address thus retrieved.

17. A network communication method for transferring data from a source communication terminal on a network via said network to a designated communication terminal on said network, and for transmitting said transferred data from said designated communication terminal to a destination communication terminal via a communication circuit, wherein
at said source communication terminal said method comprises the steps of:

providing a first modem circuit connected with said communication circuit and a communication interface circuit;

controlling said first modem circuit with a data communication circuit so as to perform data communication, said controlling step issuing a modem control command and target data for transmission to the first modem circuit;

monitoring for the target data for transmission and the modem control command being issued by said data communication circuit to said first modem circuit using a redirection circuit connected to said communication interface circuit, said data communication circuit, and a first network interface circuit connected to said network;

redirecting said target data and said modem control command being issued during said controlling step to said first modem circuit, to said designated communication terminal via said first network interface circuit; and transferring a response message returned by said designated communication terminal in reply to said modem control command via said first network interface circuit to said data communication circuit, and at said designated communication terminal said method comprises the steps of:

providing a second modem circuit connected to said communication circuit and a second network interface circuit connected to said network;

outputting, when said second modem circuit is not busy, said target data for transmission and said modem control command redirected by said redirection circuit via said network to said second modem circuit;

transferring, when said second modem circuit is not busy, a response message returned by said second modem circuit to said source communication terminal in reply to said modem control command from said source communication terminal via said second network interface circuit;

receiving, when said second modem circuit is busy, said target data for transmission and said modem control command redirected by said redirection circuit via said network;

transferring, when said second modem circuit is busy, a simulated reply message in reply to said modem control command to said source communication terminal via said second network interface circuit;

storing, when said second modem circuit is busy, said target data for transmission in a storage unit together with transmission-related information obtained from said modem control command; and transmitting, when said second modem circuit is busy, said target data for transmission stored in said storage unit to said destination communication terminal using said communication circuit by controlling said second modem circuit in accordance with said transmission-related information.

18. The network communication method as claimed in claim 17, wherein at said designated communication terminal said method further comprises the steps of:

providing a correspondence table for listing source identification information identifying said source communication terminal and mail addresses in such a way as to relate said source identification information to a corresponding mail address;

preparing an electronic mail message that includes a result of transmission of said target data for transmission to said destination communication terminal;

referring to said correspondence table to retrieve said mail address that corresponds to said source identification information obtained by examining said modem control command transferred from said source communication terminal via said first network interface circuit; and sending said electronic mail message to said mail address thus retrieved.

* * * * *